United States Patent [19]

Dumont

[11] 3,945,841

[45]*Mar. 23, 1976

[54] PROCESS FOR OBTAINING A BUILDING MATERIAL COMPRISING HYDRATED LIME AND PLASTER

[75] Inventor: Philippe A. Dumont, Stockay, Belgium

[73] Assignee: Carrieres Et Fours A Chaux Dumont-Wautier, Belgium

[ * ] Notice: The portion of the term of this patent subsequent to Aug. 6, 1991, has been disclaimed.

[22] Filed: May 29, 1973

[21] Appl. No.: 364,932

[30] Foreign Application Priority Data
June 5, 1972 United Kingdom............... 26050/72

[52] U.S. Cl................................ 106/109; 106/110
[51] Int. Cl.² ........................................ C04B 11/00
[58] Field of Search........................... 106/109, 110

[56] References Cited
UNITED STATES PATENTS
1,967,959  7/1934  McAnally .......................... 106/110
2,063,488  12/1936  Choate et al. ..................... 106/110
2,127,952  8/1938  Choate............................... 106/110
3,827,897  8/1974  Dumont............................. 106/110

FOREIGN PATENTS OR APPLICATIONS
10,130  12/1914  United Kingdom................. 106/110

Primary Examiner—Patrick P. Garvin
Assistant Examiner—John P. Sheehan
Attorney, Agent, or Firm—Hill, Gross, Simpson, Van Santen, Steadman, Chiara & Simpson

[57] ABSTRACT

Natural or synthetic gypsum is reacted with quicklime in any desired proportions, the heat needed for the complete conversion of gypsum in plaster being supplied, on the one hand, by the exothermic reaction of hydration of the quicklime and, on the other hand, by an external supply of calories obtained by indirect heating of the reaction mixture. This indirect heating may be effected by convection and conduction or by radiation from a metallic wall.

5 Claims, 3 Drawing Figures

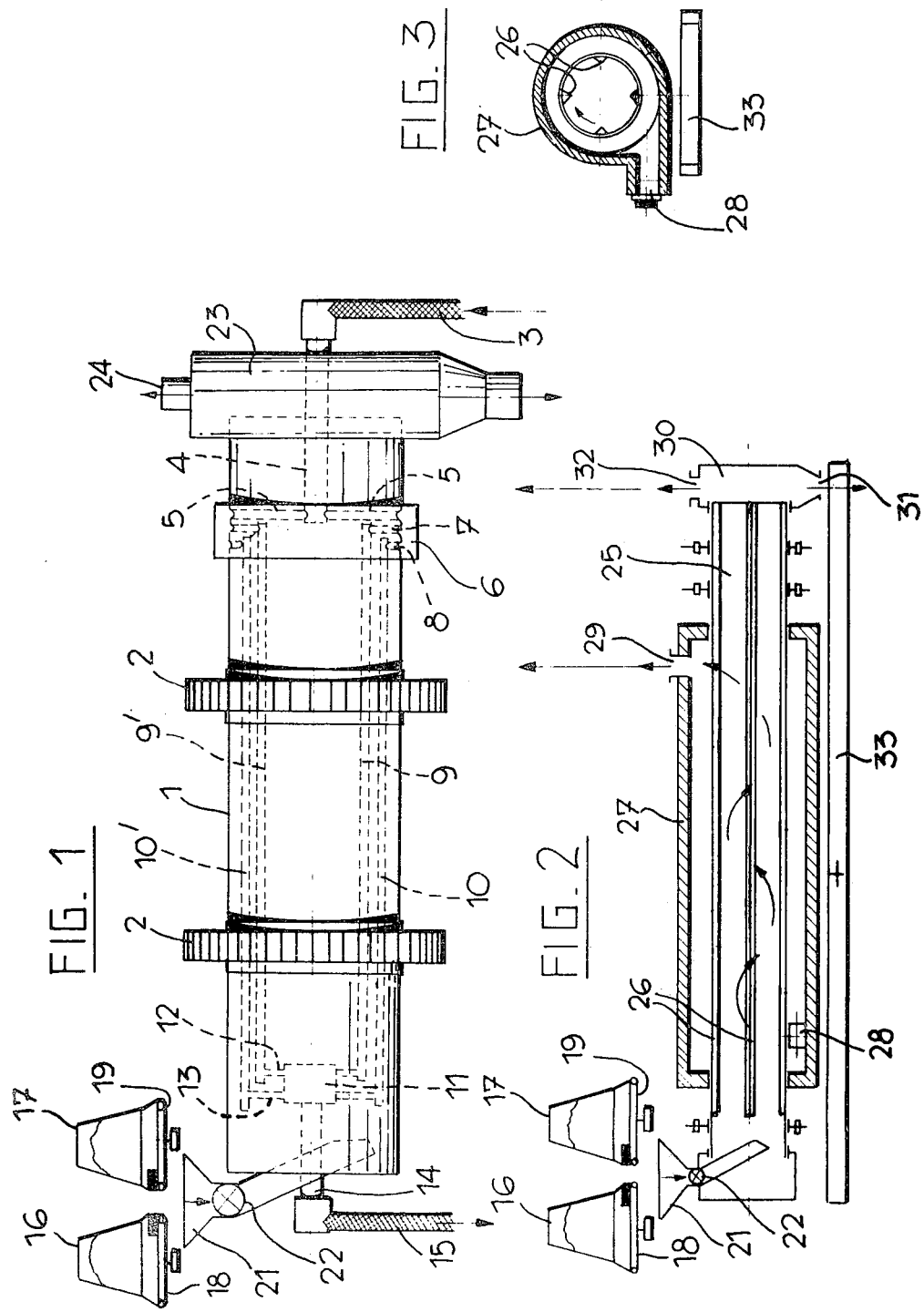

PROCESS FOR OBTAINING A BUILDING MATERIAL COMPRISING HYDRATED LIME AND PLASTER

DESCRIPTION OF THE PRIOR ART

It is known to obtain mixtures of hydrated lime and plaster containing desired proportions of these ingredients by merely mixing hydrated lime and plaster which have been separately manufactured by usual methods.

Generally, said mixtures are prepared in a factory and supplied to users in powdery and dry condition, mostly in bags.

The high cost of the starting materials, i.e., plaster and hydrated lime, as well as the transporting costs of these materials from the production plant to the manufacturer which will prepare the mixture adversely affect the cost of the mixture of said starting materials.

On the other hand, it is well known to react quicklime with natural gypsum or gypsite at a temperature of more than 150°C, so as to obtain a mixture of hydrated lime and plaster, according to the following equation:

(1) $\quad CaO + CaSO_4.2H_2O \rightarrow Ca(OH)_2 + CaSO_4 \cdot \frac{1}{2} H_2O + \frac{1}{2} H_2O$ During this reaction an exchange of materials and of heat takes place between the quicklime and the natural gypsum; the removal of the crystal water of the gypsum is caused by the heat resulting from the hydration reaction of the quicklime, the water absorbed by the quicklime resulting from the dehydration of the natural gypsum.

It seems that this known process has never been successfully used on an industrial scale, for the following reasons:

1. the heat which is necessary for converting natural gypsum into plaster results only from the heat of hydration of quicklime.

Therefore, the quantity of quicklime which is necessary for this reaction is important, so that the percentage of hydrated lime of the final product is very high.

This high proportion of hydrated lime affects the quality of the product used for ceiling coating. It has been found, in this respect, that when a mortar of hydrated lime and plaster contains more than 30 percent by weight of hydrated lime, some properties of the coatings made with said mortar, such as adherence, shrinking ability, hardness and bending and compression strength are badly affected.

2. Moreover, the need of using a great quantity of quicklime substantially increases the cost price of the mixture.

3. Due to the variations of the moisture content of natural gypsum, of the calcination state of the used quicklime and the amount of active calcium oxide contained in the lime, when it is desired to maintain, as it is advisable, a constant proportion of hydrated lime and plaster in the final product, the heat of reaction varies within large limits.

As a consequence of this variation, the reaction mass is brought to a temperature at which the hemidrate is converted into undesirable soluble anhydrite (163°C) or insoluble anhydrite (200°C).

If this occurs, a further step is necessary for converting the anhydrite into plaster, such a conversion taking place by contact with the air moisture or by addition of water.

4. For improving the reactivity of natural gypsum and reduce thereby the duration of reaction of said gypsum, it is necessary to reduce the particle size of the natural gypsum. This involves an additional step which increases the cost price of the mixture of hydrated lime and plaster.

DETAILED DESCRIPTION OF THE INVENTION

Motars based on hydrated lime [$Ca(OH)_2$] and plaster [$CaSO_4.\frac{1}{2} H_2O$] are commonly used in the building trade as coating for ceiling-works or as starting materials for the manufacture of plates or panels used as separating or covering elements.

In addition to the incorporation of fibres, sand and organic materials, such as thickening agents (for example, methyl-cellulose) or hardening retarders (for example, keratin) or other materials for the purpose of improving certain characteristics such as plasticity, hardening duration or resistance to mechanical stress, the proportions of lime and plaster may vary, in the mortars, from 1 to 9 parts by weight of the plaster for 1 part of the hydrated lime.

The present invention provides a process for producing a dry and pulverulent mixture of hydrated lime and plaster from quicklime (CaO) and gypsum ($CaSO_4.2H_2O$), according to the following reaction:

(II) $\quad CaSO_4.2H_2O + mH_2O + n\,CaO \rightarrow CaSO_4 \cdot \frac{1}{2} H_2O + n\,Ca(OH)_2 + \left(m + \frac{3}{2} - n\right) H_2O$ gaseous According to the relative proportion of the starting materials, i.e., gypsum, free water and quicklime or according to the weight ratio of the final ingredients of the resulting mixture, i.e., plaster and hydrated lime, an additional heat source, that is, a heat source other than the heat supplied by the reaction of hydration of quicklime into hydrated lime, is needed for reaction (II), in accordance with this invention.

The reaction (II) starts at a temperature of more than 100°C. and preferably takes place at a temperature of more than 150°C.

The minimum temperature at which gypsum is converted into plaster is quickly reached by the reaction between the quicklime and the free water which is generally contained in the gypsum.

According to this invention, the energy needed for converting gypsum into plaster and for removing the humidity of the gypsum is supplied, on the one hand, by the exothermic reaction of hydration of the quicklime when in contact with the water of crystallisation of the gypsum and/or with any free water which may be present in the reaction mixture and, on the other hand, by indirect heating of this mixture, this heating being preferably performed by conduction and convection or by radiation from a metallic wall.

The additional heat source which compensates the lack fo calories of the reaction (I) has the following advantages;

1. it allows a free choice of the proportions of the two solid components of the final mixture;
2. due to the supply of calories by indirect heating, it is possible to control the reaction by maintaining a constant reaction temperature;
3. the variations of free water contained in the gypsum can be compensated automatically by a variable supply of calories;
4. due to the additional heat source, the optimum reaction temperature, which is necessary for completely converting gypsum into plaster, while avoiding the formation of undesired soluble or insoluble anhydrite, can easily be maintained; and
5. the manufacture of a mixture of plaster and hydrated lime of a constant quality is possible by a one-step method.

Due to its particle size, synthetic gypsum, such as phosphogypsum which is a by-product obtained during the manufacture of phosphoric acid, is particularly suitable in the process according to this invention, although natural gypsum can also be used in this process.

Taking into account the formation heat of the compounds used in reaction (II) and the sensible heat of the obtained mixture, the total thermic balance of reaction (II) is equal to $\Delta H_{total} = 20715 + 12139m - 25130$ (calories/mol of gypsum) (II).

In equation (II), the numerical values are taken from Chemical Engineers Handbook, edited by John H. Perry; 4th edition.

Due to the insufficient amount of used quicklime for completing reaction (I), one has:

$$\Delta H_{total} > 0$$

Since the reaction is endothermic, it is necessary to use a fuel for supplying the amount of heat needed for completing reaction (I), so that $$\Delta H_{total} + \Delta H_{fuel} \leq 0$$

This additional supply of heat can be obtained by indirect heating in an apparatus as shown in FIG. 1 of the attached drawings.

Said apparatus comprises a cylindrical container 1 having an horizontal axis and wherein the reagents are intimately mixed. The container 1 is equipped with means, such as toothed rings 2, for rotating it about its horizontal axis.

A heat carrying fluid, such as steam or hot water, is introduced by pipes 3,4 and 5 in a distributing box 6, from which it is conveyed by pipes 7 and 8 into stationary longitudinal ducts 9, 9′ and 10, 10′ which supply heat to the reaction mixture in container 1 by convectionconduction and act as a stirrer of said reaction mixture. The fluid is collected into a box 11 connected to ducts 9, 9′ and 10, 10′ by small pipes 12 and 13. From the box 11, the cold fluid is discharged through pipes 14 and 15.

Quicklime ad gypsum discharged respectively from a hopper 16 and a hopper 17 on conveyors 18, 19 are collected into a feed hopper 21. By the opening of a rotating valve 22, said starting materials are introduced into the mixer 1.

FIGS. 2 and 3 of the attached drawings show diagrammatically, respectively in longitudinal and transverse section, an apparatus wherein heat is supplied to the reaction mixture by radiation from a metallic wall. This apparatus comprises a cylindrical rotating mixer 25 equipped with internal triangular partitions 26 having a height of less than the diameter of cylinder 25. A jacket 27 for the circulation of a heat carrying fluid surrounds the mixer, the fluid entering in the jacket at an inlet 38 and being removed from it at an outlet 29.

At the discharge end of the mixer 25, the reaction product is collected in a discharge box 30 having an outlet 31 for the product and an outlet 32 for the excess of water vapour. The discharged product is removed on a conveyor 33.

The starting materials are introduced into the mixer 25 by feeding means which are similar to those shown in FIG. 1 (hoppers 15, 16; conveyors 17, 18; hopper 20, rotating valve 19).

The following example illustrates the process according to this invention.

EXAMPLE

For preparing a mixture containing 25 percent by weight of hydrated lime and 75 percent by weight of plaster, a synthetic gypsum containing 10 percent of moisture is used.

The value of m in equation (II) is 1.06 mols/mol of gypsum and the number of mols of quicklime per mol. of gypsum is equal to 0.65 (n), so that equation (II) can be written as follows:

$$CaSO_4 \cdot 2H_2O + 1.06H_2O + 0.65CaO \rightarrow CaSO_4 \cdot \tfrac{1}{2} H_2O + 0.65\ Ca(OH)_2 + 1.91\ H_2O$$

For a yield of 85 percent of the calories supplied by the quicklime, the heat balance of reaction (II) corresponds to the following equation:

(III)  $H_{total} = 20{,}715 + 12{,}867 - \dfrac{25{,}130 \times 0.65 \times 85}{100} =$ $20{,}715 + 12{,}867 - 13{,}844 = 19{,}698$ calories/mol of gypsum Therefore, the minimum amount of heat to be supplied by indirect heating is equal to 19,698 calories/mol of gypsum.

In an apparatus as shown on FIG. 1, 840kg of phosphogypsum containing 84 kg of free water have been mixed with 160 kg of powdery quicklime, these amounts being introduced into the mixer over a period of three hours at a rate of 0.89kg/minute for the quicklime and 4.67kg/minute for the phosphogypsum.

Due to the presence of free water in contact with the quicklime, the temperature of the mixture quickly reached a value of more than 140°C.

For completing the reaction, additional heat has been supplied by circulating in tubes 9, 9′ and 10, 10′ a heat carrying fluid having an inlet and outlet temperature of about 240°C and 200°C respectively.

The temperature of the mixture of hydrated lime plaster at the outlet of the apparatus was about 160°C and the period during which the reaction mixture remained in the reactor was about 20 minutes.

The resulting mixture contained 750kg of plaster and 250 kg of hydrated lime.

No residual calcium oxide or dihydrated calcium sulphate was found by analysis in this mixture.

What I claim is:

1. A process for producing a building material from plaster or hemihydrated calcium sulphate and hydrated lime or calcium hydroxide in dry and powdery condition, comprising reacting phosphogypsum, a by-product obtained during the manufacture of phosphoric acid, and quicklime both in pulverulent state in proportions suitable for obtaining a mixture containing 1 to 9 parts by weight of plaster to 1 part by weight of hydrated lime; supplying part of the heat needed for the conversion of gypsum into plaster by the exothermic reaction of hydration of the quicklime; and also effecting indirect heating of the reaction mixture.

2. A process according to claim 1, comprising indirectly heating the reaction mixture by conduction and convection.

3. A process according to claim 1, comprising indirectly heating the reaction mixture by radiation from a metal wall.

4. A process according to claim 1, comprising supplying an external heat supply to effect said indirect heating and thereby compensating for a lack of calories in the reaction.

5. A process according to claim 1 comprising using wet phosphogypsum.

* * * * *